| United States Patent [19] | [11] Patent Number: 4,961,981 |
| Keegan | [45] Date of Patent: Oct. 9, 1990 |

[54] WEIGHTED NETTING

[76] Inventor: Patrick K. Keegan, P.O. Box 441522, Houston, Tex. 77244-1522

[21] Appl. No.: 322,691

[22] Filed: Mar. 13, 1989

[51] Int. Cl.$^5$ .............................................. B32B 3/12
[52] U.S. Cl. ..................................... 428/72; 428/192; 428/193; 428/76; 52/3; 150/154; 160/DIG. 2
[58] Field of Search .................... 428/81, 83, 193, 192, 428/157, 38, 72, 76; 52/3; 150/154; 160/DIG. 2

[56] References Cited

U.S. PATENT DOCUMENTS

| 1,298,550 | 3/1919 | Newell . | |
| 1,360,832 | 11/1920 | Villapol . | |
| 2,692,017 | 10/1954 | Lang | 160/327 |
| 2,927,331 | 3/1960 | Rutz | 5/362 |
| 3,053,566 | 9/1962 | Allen | 296/106 |
| 3,259,151 | 7/1966 | Schmitz | 139/425 |
| 3,295,264 | 1/1967 | Olson | 52/12 |
| 3,862,876 | 1/1975 | Graves | 161/44 |

Primary Examiner—Alexander S. Thomas
Attorney, Agent, or Firm—Harrison & Egbert

[57] ABSTRACT

A cover article that comprises a plurality of compartmentalized members connected together to form a geometric shape, a netting connected to the plurality of compartmentalized members and extending across the interior of the geometric shape, and a plurality of weighted elements contained within the interior area of each of the compartmentalized members. The compartmentalized members are made up of a tube of flexible material having closed ends. The closed ends are hinged to adjacent compartmentalized members. Each of the compartmentalized members are generally water-resistant. The netting has a cross-hatched configuration suitable for preventing insects from passing therethrough. The weighted elements are made up of high-density plastic debris or lead pellets having a buoyancy suitable for floating on water. The plastic debris fills less than two-thirds of the entire interior volume of each of the compartmentalized members.

18 Claims, 4 Drawing Sheets

WEIGHTED NETTING

TECHNICAL FIELD

The present invention relates generally to articles intended to protect one against insects. More particularly, the present invention relates to netting having weighted edges suitable for use onboard boats.

BACKGROUND ART

Cover cloths, which include tarpaulins, drop cloths, blankets, sheets, wrapping and the like, have many uses both inside and outside various types of structures. Many of these pieces include coverings for objects during painting, protection of various items from adverse weather conditions, protection for stored items and the like. All such coverings are sheetlike material, and, as such, they are subject to being disarranged from their spread-out covering position over the desired area by many different factors. People, vehicles, wind, and the like, can cause a disarray of the covering so as to expose covered objects.

On boats, the use of cover cloths is inappropriate. On boats, there is constant sway, constant motion of wind and waves, and constant movement by persons thereabout. As such, it becomes extremely difficult to make such covered cloths suitable for use on boats. Additionally, insofar as covered cloths could be used to cover the hatches of boats, it is often undesirable to utilize a cloth material, as such, as a covering for the hatch. Since covers are rather solid, opaque material, it would become difficult to cover the hatches and holes of a boat while still permitting the persons within the hatch to have a view of the operations on the boat.

When using the boat in coastal areas, sleep becomes difficult because of problems of heat, inadequate ventilation and insects. If a solid cover is utilized over the hatches and holes, then ventilation becomes greatly restricted, and the heat within the boat becomes unbearable. It is always an object to have constant ventilation passing through the interior of the boat under such conditions. However, when the cover is not used, insects have open access to the persons onboard the boat.

It is an additional problem with such weighted cover cloths in boat use that storage becomes difficult or impossible. Where solid lead weights are used in the protective edge of such covers, it is difficult to fold, compress, and store onboard the boat. Such configurations take a great deal of the available room. Additionally, in various prior art types of cover cloths, the material within the weighted edges is free to distribute throughout the weighted edge. As such, during the movement of the boat, the weight may become redistributed and cause the covering to become undone.

Various U.S. patents have described weighted edges about cloth and similar material. U.S. Pat. No. 3,862,876, issuing to James Graves, on Jan. 28, 1975, shows a protective cover cloth having continuous flexible weights secured along at least two opposing edges of the cover. The purpose of this patent was to provide a cloth that would protect on against wind blowing and other disturbances. The cloth, however, is made of woven, natural or synthetic fibers, of continuous sheet material such as synthetic plastic film, or may be made of a metal covered sheet material, such as aluminum foil or canvas.

U.S. Pat. No. 3,295,264 shows a screen material, such as netting, that has built-in weights at the edges. In particular, this device shows a gutter system utilizing a flexible guard. It is the purpose of this invention to keep material from building up in a gutter. In addition, U.S. Pat. No. 2,259,151 shows fabric having weighted edges.

Each of these prior art patents is somewhat unsuitable for use onboard boats. First, without having compartmentalized weight-containing edges, the material is free to distribute throughout the weighted edge. Secondly, it is important, for boat use, that such apparatus be easily folded, compressed, and stored. It is important that the material within the weighted edges be a netting material so as to properly keep mosquitoes out while allowing open ventilation. Also, these devices would tend to sink if dropped overboard.

It is an object of the present invention to provide a weighted netting that is suitable for use onboard boats.

It is another object of the present invention to provide a weighted netting that is suitable for being compressed and stored.

It is still a further object of the present invention to provide a weighted netting in which the weighted material will not become redistributed throughout the weighted edge.

It is still another object of the present invention to provide a weighted netting that is suitable for floating on water.

These and other objects and advantages of the present invention will become apparent from a reading of the attached specification and appended claims.

SUMMARY OF THE INVENTION

The present invention is a cover article that comprises a plurality of compartmentalized members connected together so as to form a geometric shape, a netting that is connected to the plurality of compartmentalized members across the interior of the geometric shape, and a plurality of weighted elements contained within the compartmentalized members. Each of these components together form the weighted netting of the present invention and offer the advantages afforded by such weighted netting.

The plurality of compartmentalized members comprise a tube of flexible material having closed ends. These closed ends serve to contain the weighted elements therewithin. This tube, in general, has a bulging middle section. The tube then narrows to each of the closed ends. Each of the compartmentalized members are hinged to adjacent compartmentalized members such that each member may rotate (or move angularly) with respect to an adjacent member. This allows the easy folding, movement, and storage of the weighted netting of the present invention.

The compartmentalized members are made of a material, such as cloth, vinyl, and leather. Ideally, a water-resistant coating is provided on the exterior of such material. This offers greater weather resistance to the weighted netting of the present invention. Furthermore, and ideally, the interior of these compartmentalized members are watertight so that the weighted members do not become affected or otherwise damaged by the intrusion of water.

The geometric shape of these compartmentalized members has a shape and size suitable for being placed about the exterior of a hatch or a hole of a boat. Ideally, the compartmentalized members may be shaped and molded by the user to fit around the edges of the hatch. The netting utilized has a cross-hatched configuration.

As with most mosquito netting, the cross-hatches of the netting have a size suitable for preventing insects from passing therethrough.

The weighted elements of the present invention comprise a plurality of pellets contained within the interior of each of the compartmentalized members. In the preferred embodiment of the present invention these pellets are high-density plastic debris having a buoyancy suitable for floating on water. However, if the compartmentalized members are watertight, then the weighted members may be lead pellets. The pellets fill less than two-thirds of the entire interior volume of each of the compartmentalized members. By filling less than the entire volume, each of the compartmentalized members may be more easily molded, compressed, and stored.

In an alternative embodiment of the present invention, the weighted netting of the present invention may be removed from boat use and used on shore, or other places, as coverings for vehicles, hunting blinds, or as a sleep covering for an individual. When utilized in this fashion, the area of the netting will be in excess of the area within the geometric shape of the compartmentalized members. Also, if used during hunting, it should be important that a slot be provided in the netting so as to allow a gun to extend therethrough.

DETAILED DESCRIPTION OF THE INVENTION

Figure 1:
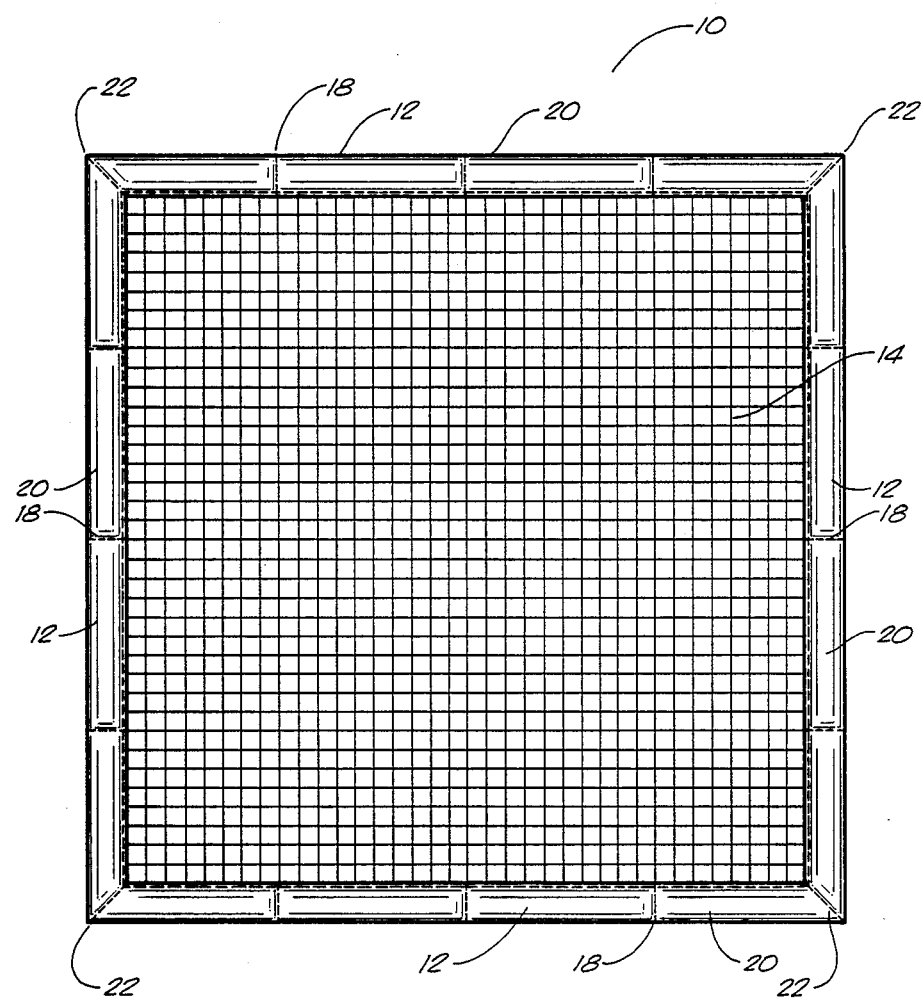
FIG. 1 is a frontal view of the weighted netting in accordance with the preferred embodiment of the present invention.

Referring to FIG. 1, there is shown at 10 the weighted netting in accordance with the preferred embodiment of the present invention. Weighted netting 10 comprises a plurality of compartmentalized members 12 connected together so as to form a rectangular geometric shape. Netting 14 is connected to the plurality of compartmentalized members 12 across the interior of the geometric shape. Although not shown in FIG. 1, a plurality of weighted elements are contained within each of the compartmentalized members 12.

Each of the compartmentalized members 12 are hinged at 18 to an adjacent compartmentalized member 20. The details of the hinging arrangement are shown in FIG. 2.

As can be seen in FIG. 1, the compartmentalized members 12 extend around the perimeter of the geometric shape. A special angled connection 22 forms the corners of the geometric shape. The netting 14 is attached to the inner surface 24 of the plurality of compartmentalized members 12. Netting 14 may be connected by knots, by stitching, by adhesives, by hooks, or by any other suitable means. The hinges 18 allow each of the compartmentalized members to rotate and to angularly move relative to the adjacent compartmentalized member 20. The compartmentalized members are made of a flexible material. This flexible material may include cloth, vinyl, and leather. Of course, many other materials may be substituted for such cloth, vinyl, and leather. The present invention should not be limited by the selection of the particular type of material as used for the formation of the compartmentalized members. The interior of the compartmentalized members should be watertight. This will prevent the intrusion of water into the interior of each of the compartmentalized members. For the purpose of protecting the material within the compartmentalized members 12, the exterior of the material should be of a water-resistant coating (as better shown in FIG. 3).

As can be seen, netting 14 has a cross-hatched configuration. The size of the cross-hatches should be sufficient to prevent insects from passing therethrough. In simple terms, netting 14 may be a standard type of mosquito netting.

Figure 2:
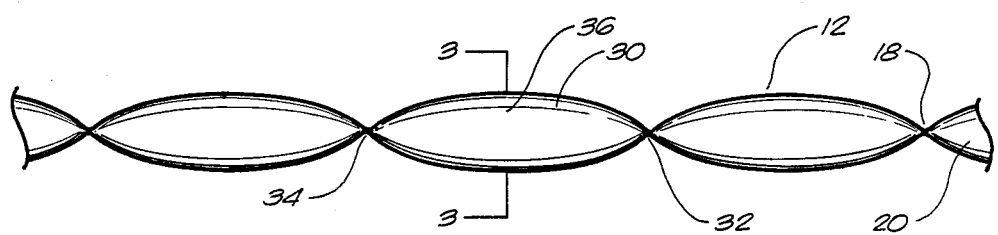
FIG. 2 is a side view of the configuration of the compartmentalized members of the preferred embodiment of the present invention.

Referring to FIG. 2, there is shown a side view of the compartmentalized members 12 of the present invention. It can be seen that the compartmentalized members 12 are made up of a tube 30 of a flexible material. Tube 30 has closed ends 32 and 34. The closing of ends 32 and 34 keeps the weighted elements from passing from tube 30 to an adjacent compartmentalized member. Also, it can be seen that tube 30 has a rather bulging middle section 36. The tube 30 then tapers to the closed ends 32 and 34. In the manufacture of the compartmentalized members, it may be possible to have long sections of tubular material for each of the edges of the geometric shape. After the edges are formed, the separate compartmentalized sections may be developed by sewing the walls of the tubes 30 together at the ends 32 and 34. The hinged section 18 would then result from this joining of the ends of each section. The walls may be closed together by seam welding, sewing, or other attachment process. It is important to emphasize that each of the compartmentalized members 12 does not need to be of a separate section of material. Manufacturing efficiencies may be achieved by the above-identified process.

Figure 3:
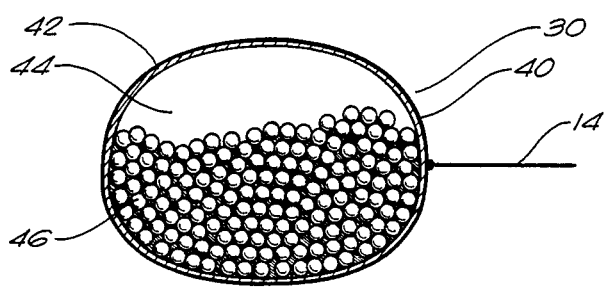
FIG. 3 is a cross-sectional view of the interior of the compartmentalized members taken across lines 3—3 of FIG. 2.

FIG. 3 is a cross-sectional view of tube 30. It can be seen that the netting 14 is attached to the outer diameter of tube 30. It can be also seen in FIG. 3 that the water-resistant coating 40 extends around the exterior of the tube of flexible material 42. The water-resistant coating 40 will improve the life of the compartmentalized members and will prevent the intrusion of water into the interior 44 of member 30.

In FIG. 3, the plurality of weighted elements 46 are specifically shown. It can be seen that these weighted elements 46 are pellets distributed within the interior of member 12. Ideally, these pellets 46 are made up of a high-density plastic debris. By using a high-density plastic debris, the proper weighting of the netting 10 is achieved while eliminating many of the problems of leaden pellets. The plastic debris will not corrode or deteriorate when exposed to sea water. Additionally, the plastic debris has a buoyancy suitable for floating on water. As such, the weighted netting 10 will not sink if it is accidentally dropped overboard. Finally, the plastic debris 46 may be more easily compressed than the use of leaden pellets. If leaden pellets are utilized, then it is more important for the present invention that the compartmentalized members 12 be watertight. As shown in FIG. 3, these pellets 46 fill less than two-thirds of the entire interior volume of the compartmentalized member 30. As such, it becomes easier to mold the members around the hatch of a boat, to store the weighted netting 10 in the hole of a boat, or to otherwise manipulate the netting for proper use.

Figure 4:
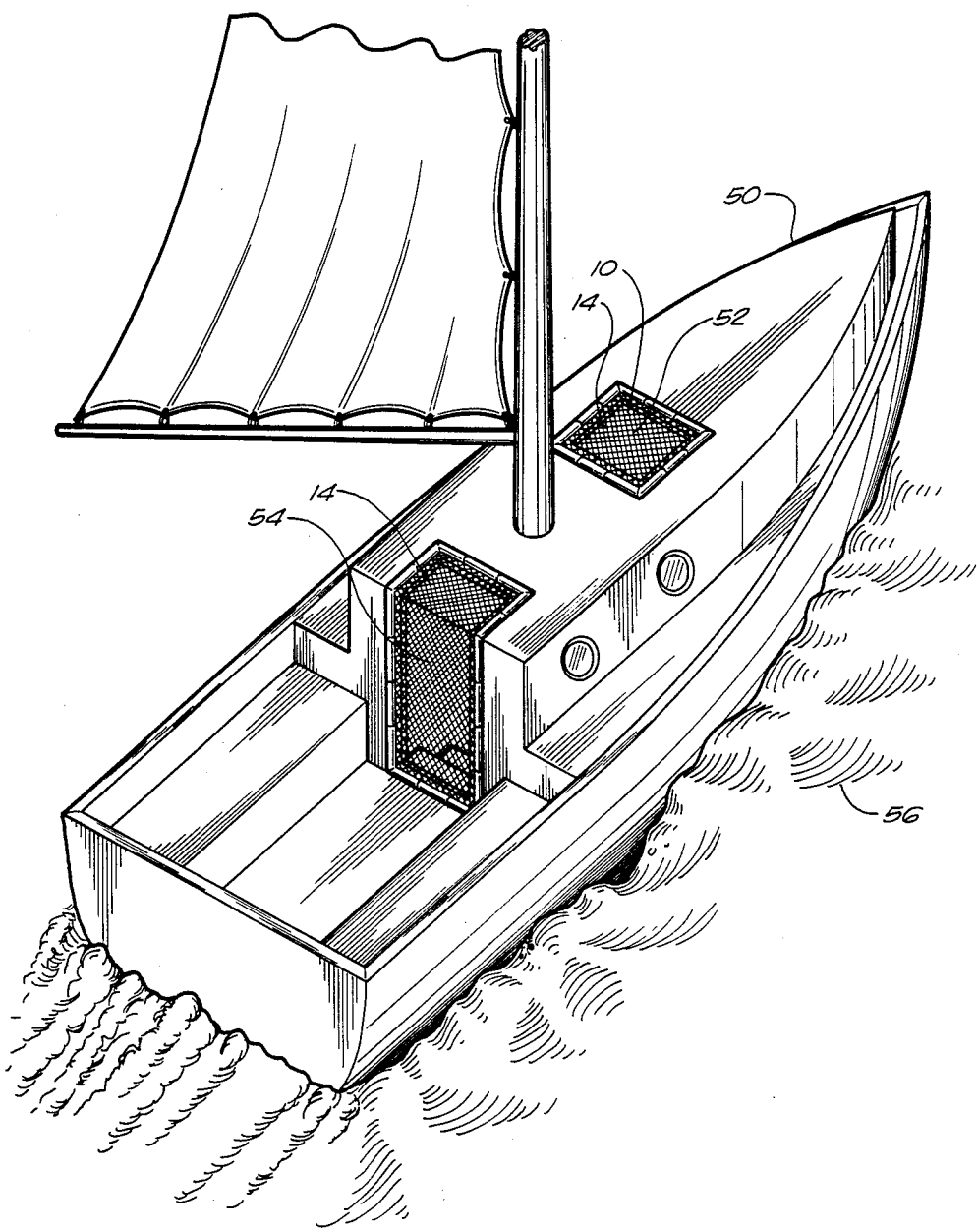
FIG. 4 is a perspective view showing the use of the weighted netting of the present invention onboard a boat.

FIG. 4 shows the use of the weighted netting 10 onboard a boat 50. It can be seen that weighted netting 10 is utilized to cover the square hatch 52 and is also utilized to cover the doorway 54 to the interior of the boat. The compartmentalized members of the weighted netting 10 are molded around the hatches. As used in FIG. 4, the weighted netting 10 affords a number of advantages not found by prior protective systems. Most importantly, the protective netting 14 keeps insects from intruding into the comfort and enjoyment of the passengers of the boat 50. When boat 50 is moored adjacent to shore lines, it is common for insects to be a major problem. Since the mosquito netting 14 has a cross-hatching that prevents the intrusion of mosquitoes, or other insects, the passengers within the boat 50 shall be free of such difficult problems. Additionally, the use of the netting 14 allows those passengers within boat 50 to enjoy the comfort of the open ventilation. In case of an emergency, the passengers within the interior of boat 50 can easily see through the netting 14 so as to observe any occurrences.

Since boat 50 is on water, the boat 50 will sway, will rock, and will otherwise tilt and move with the action of waves 56. If the compartmentalized members of the weighted netting 10 did not exist, the weighted elements within the interior would slowly distribute to one side or another. By compartmentalizing the weighted members, this drift or other improper distribution of the weighted elements will not occur. As such, the netting 10 will stay in place despite the strong action of waves 56. Additionally, the hinging of the sections together allows one to easily store the netting 14 within the interior of the boat following use. The ability to stow netting 10 is enhanced by the use of a pliable material for the compartmentalized members and the amount of high-density plastic debris contained within each of the compartments.

Also, unlike prior systems, the present weighted netting 10 will float on the water. Even if a giant wave swept over the boat and dislodged the weighted netting 10 from the hatch 52, or if the weighted netting 10 was accidentally dropped or knocked overboard, the weighted netting 10 would float on the water and could possibly be available to be found in the water. Other types of weighted cloth would simply sink to the bottom of the water and be lost forever.

For these reasons, the weighted netting 10 of the present invention is particularly suitable and particularly advantageous for use onboard boats. However, the netting of the present invention may also be used in a variety of other circumstances.

Figure 5:
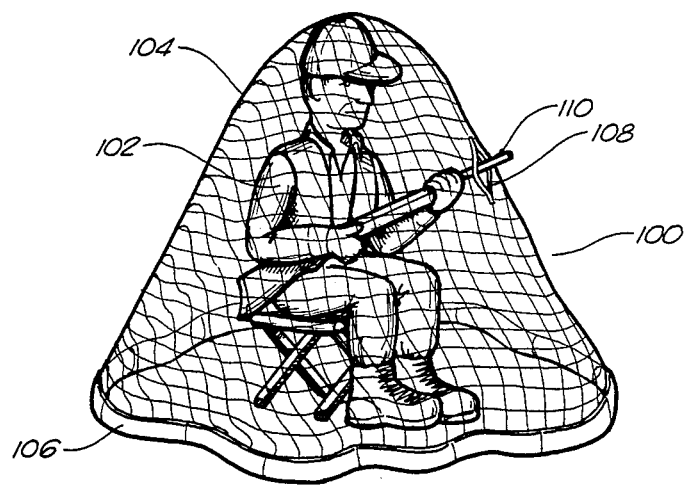
FIG. 5 is an illustration of the use of an alternative embodiment of the present invention as a personal covering.

FIG. 5 shows an alternative embodiment of the present invention in which the weighted netting 100 is used to cover a hunter 102 in a sitting position. When hunters, such as 102, are in insect-rich areas, it is often advantageous to protect oneself within a mosquito netting 104. The compartmentalized members 106 can then be formed into a circular area and placed on the ground Since the netting 104 has a larger surface area than the area within the geometric shape of compartmentalized members 106, a hunter will have room to sit upright while being covered with the netting. A slot 108 may be provided in netting 104 so as to allow hunter 102 to point gun 110 therethrough. In addition, the embodiment 100 of FIG. 5 can also allow the hunter 102 to recline in a prone position. The optional slot 108 can be either half moon or vertical so as to allow the hunter 102 to stick gun 110 therethrough. To enhance the hunting ability of hunter 102, netting 104 may be of camouflage color.

Figure 6:
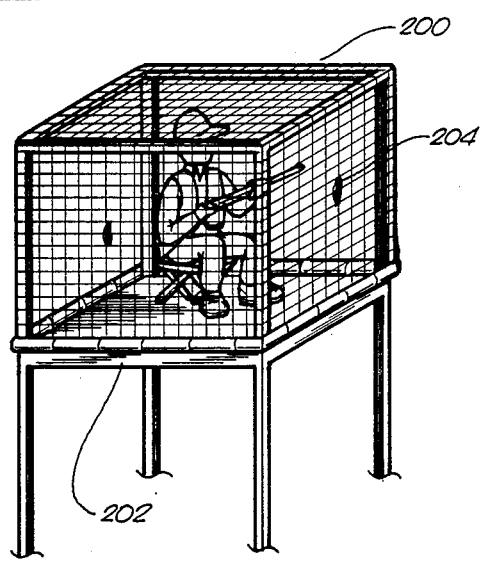
FIG. 6 is an alternative embodiment of the present invention showing the use of the weighted netting of the present invention as a hunting blind.

As a variation on embodiment 100, the weighted netting of the present invention may be used as shown in FIG. 6. In FIG. 6, it can be seen that the weighted netting 200 has a rather cubical configuration that is fitted over the exterior of hunting blind 202. To fit over the hunting blind 202, the weighted netting 200 should have a size larger than that utilized in FIG. 5 or onboard the boat of FIG. 4. However, the concept as utilized in FIG. 6 is similar to that of FIG. 5. A slot 204 may be provided and placed adjacent to the opening of hunting blind 202.

Figure 7:
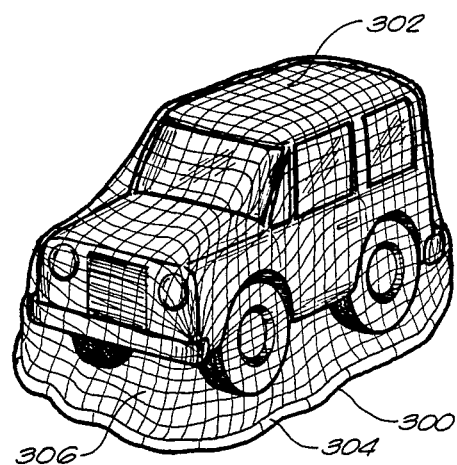
FIG. 7 is an alternative embodiment of the present invention showing the use of the present invention as a vehicular covering.

FIG. 7 illustrates the use of the present invention as a weighted netting 300 covering the exterior of a vehicle 302. In the embodiment of FIG. 7, if hunters or campers desired to remain in their vehicle overnight, the weighting netting 300 would provide such hunters and campers with protection against mosquitoes. Once again, the configuration of the compartmentalized members 304 will allow the weighted netting 300 to be easily utilized. The netting 306 should have a size great enough to cover the entire exterior of vehicle 302. This configuration could also be useful in military activities, particularly those in remote, insect-infested areas.

As detailed previously, the present invention offers significant improvements over other weighted cloth techniques. Importantly, the present invention may be manufactured at an extremely low cost. Furthermore, the present invention offers significant advantages for boaters, for hunters, for campers, and for military use.

The foregoing disclosure and description of the invention is illustrative and explanatory thereof. Various changes in the details of the illustrated construction may be made within the scope of the appended claims without departing from the true spirit of the invention. The present invention should be limited by the following claims and their legal equivalents.

I claim:

1. A cover article comprising:
    a plurality of compartmentalized members connected together so as to form a geometric shape;
    a netting connected to said plurality of compartmentalized members across the interior of said geometric shape, said netting having a cross-hatched configuration, each of the cross-hatches of said configuration having a size suitable for preventing insects from passing therethrough and a size suitable for enabling visual observation therethrough; and
    a plurality of weighted elements contained within said compartmentalized members.

2. The article of claim 1, each of said plurality of compartmentalized members comprising:
    a tube of flexible material having closed ends, said closed ends for containing said plurality of weighted elements therewithin.

3. The article of claim 2, said tube having a bulging middle section, said tube narrowing to said closed ends.

4. The article of claim 2, each of said plurality of compartmentalized members being hinged to adjacent compartmentalized members such that one compartmentalized member may move relative to an adjacent compartmentalized member.

5. The article of claim 1, said plurality of compartmentalized members being of a material selected from the group consisting of: cloth, vinyl and leather.

6. The cover of claim 5, said plurality of compartmentalized members having a water-resistant coating on the exterior of said material forming said compartmentalized members.

7. The article of claim 1, said geometric shape having an interior edge of a size larger than the size of the exterior of a hatch of a boat.

8. The article of claim 1, said plurality of weighted elements comprising pellets contained in the interior of each of said plurality of compartmentalized members.

9. The article of claim 8, said pellets comprising high-density plastic debris having a buoyancy suitable for floating on water.

10. The article of claim 8, said pellets comprising lead pellets contained within each of said compartmentalized members, the interior of said compartmentalized members being watertight.

11. A cover article comprising:
a plurality of compartmentalized members connected together so as to form a geometric shape, said plurality of compartmentalized members being of a material selected from the group consisting of: cloth, vinyl and leather, said plurality of compartmentalized members having a water-resistant coating on the exterior of said material forming said compartmentalized members, the interior of said plurality of compartmentalized members being water-tight;
a netting connected to said plurality of compartmentalized members across the interior of said geometric shape; and
a plurality of weighted elements contained within said compartmentalized members.

12. A cover article comprising:
a plurality of compartmentalized members connected together so as to form a geometric shape;
a netting connected to said plurality of compartmentalized members across the interior of said geometric shape; and
a plurality of weighted elements contained within said compartmentalized members, said plurality of weighted elements comprising pellets contained in the interior of each of said plurality of compartmentalized members, said pellets filling less than two-thirds of the entire interior volume of each of said plurality of compartmentalized members.

13. A cover article comprising:
a plurality of compartmentalized members connected together in hinged relationship so as to form a geometric shape, each of said plurality of compartmentalized members containing a plurality of weighted elements, said plurality of compartmentalized members connected together such that said plurality of weighted elements are restricted from movement between adjacent compartmentalized members, said weighted elements comprising high density plastic debris; and
a netting connected to said plurality of compartmentalized members across the interior of said geometric shape.

14. The article of claim 13, said plastic debris filling less than two-thirds of the entire interior volume of each of said plurality of compartmentalized members, said plastic debris having a buoyancy suitable for floating on water.

15. The article of claim 13, each of said compartmentalized members being comprised of a flexible material having closed ends, said flexible material being coated with a water-resistant coating.

16. The article of claim 13, said geometric shape being a circular configuration, said netting extending between the inner walls of said circular configuration.

17. The article of claim 16, said netting having a surface area greater than the surface area of the inner walls of said circular configuration of said plurality of compartmentalized members.

18. The article of claim 17, said netting including an opening extending through said netting.

* * * * *